United States Patent [19]

Iizuka et al.

[11] Patent Number: 5,129,269
[45] Date of Patent: Jul. 14, 1992

[54] METER FOR AUTOMOBILE

[75] Inventors: Tsutomu Iizuka; Tatsuo Ikegaya, both of Shimada, Japan

[73] Assignee: Darling-Delaware Company, Inc., Dallas, Tex.

[21] Appl. No.: 521,369

[22] Filed: May 10, 1990

[30] Foreign Application Priority Data

May 15, 1989 [JP] Japan ................. 1-54445[U]
May 15, 1989 [JP] Japan ................. 1-54446[U]

[51] Int. Cl.$^5$ ................. G01D 13/04; G01D 13/12; G01D 13/22
[52] U.S. Cl. ................. 73/866.3; 73/431; 116/286; 116/328; 116/DIG. 5; 116/DIG. 41; 362/30
[58] Field of Search ................. 73/431, 866.3; 116/286, 116/287, 288, 328-332, 334, 335, 336, DIG. 36, DIG. 41, DIG. 5; 340/438, 691, 693; 362/23, 29, 30, 26

[56] References Cited

U.S. PATENT DOCUMENTS

| | | | |
|---|---|---|---|
| 746,600 | 12/1903 | Stevens | 116/334 |
| 2,805,637 | 9/1957 | Dillon | 73/431 X |
| 3,161,062 | 12/1964 | Huston | 116/286 X |
| 3,245,375 | 4/1966 | Fiedler et al. | 116/334 |
| 3,463,118 | 8/1969 | Wood | 116/335 |
| 3,727,041 | 4/1973 | Scott | 116/286 X |
| 3,955,190 | 5/1976 | Teraishi | 350/403 X |
| 4,771,368 | 9/1988 | Tsukamoto et al. | 116/286 X |
| 4,872,093 | 10/1989 | Shimizu | 116/DIG. 6 X |
| 4,875,433 | 10/1989 | Tsukamoto | 116/335 |
| 4,878,453 | 11/1989 | Inoue et al. | 116/288 |

FOREIGN PATENT DOCUMENTS

| | | | |
|---|---|---|---|
| 300592 | 1/1989 | European Pat. Off. | 116/334 |
| 1447388 | 1/1969 | Fed. Rep. of Germany | 362/29 |
| 2125216 | 12/1971 | Fed. Rep. of Germany | 116/DIG. 5 |
| 3142098 | 5/1983 | Fed. Rep. of Germany | 116/286 |
| 1527 | 1/1980 | Japan | 116/286 |
| 130722 | 10/1981 | Japan . | |

*Primary Examiner*—Tom Noland
*Attorney, Agent, or Firm*—Harold E. Meier

[57] ABSTRACT

In a meter for an automobile comprising a meter case, a pointer driven by a meter drive unit, a dial plate having a display area and a graduations, characters and patterns display part formed on a base, the dial plate having a ground color providing a background to permit recognition of the position of the pointer, and an illumination lamp located on the rear side of the dial plate mounted in the meter case so as to illuminate the dial plate from the rear side or from the front side through a light guide member, at least one of the display area and the display part of the dial plate is formed by evaporation of a metal film permeable to light.

7 Claims, 2 Drawing Sheets

METER FOR AUTOMOBILE

BACKGROUND OF THE INVENTION

1. Field of the Invention

This invention relates to a meter for an automobile, and more particularly to a meter mounted on an instrument panel in an automobile so as to display, for example, the speed of the automobile.

2. Description of the Prior Art

An instrument panel in an automobile includes a meter case on which a speed meter displaying the speed of the automobile, a fuel gauge, a water temperature meter, various alarm lamps, etc. are disposed.

That is, a dial plate is fixed inside the meter case of the instrument panel of the automobile, and the speed meter, fuel gauge, water temperature meter, various alarm lamps, etc. are disposed on this dial plate. A plate permeable to light is disposed behind the dial plate, and, for example, a meter drive unit of the speed meter is fixed to the meter case on the rear side of the light-permeable plate. A pointer of the speed meter driven by the meter drive unit on the basis of the result of speed measurement is disposed on the front side of the dial plate.

An illuminating lamp is mounted on the back wall of the meter case. A glass plate is disposed on the front side of the meter case. The light emitted from the lamp passes through the light-permeable plate to irradiate the back surface of the dial plate thereby illuminating the dial plate from the rear side by the light transmitting through the light-permeable plate. In another form, the light emitted from the lamp is guided through a light guide member toward the front side of the dial plate, thereby illuminating the dial plate from the front side.

The dial plate used hitherto is provided by preparing a transparent base of, for example, a synthetic resin, printing a light-permeable ink providing a bright ground color of, for example, white on the transparent base to form a display area of the speed meter, and then selectively printing an ink of a dark color, for example, grey on the display area thereby forming a display part for displaying meter graduations, characters and patterns. An ink of black color is then printed on the dial plate except the display area so as to form an outer frame of the meter. Thus, when the light from the lamp irradiates the rear surface of the dial plate, the light permeates the speed display area only, so that the graduations characters and patterns display part can be recognized in the form of silhouettes.

As another prior art means, the dial plate is provided by printing an ink providing a bright ground color, for example, white on the surface of the transparent base to form the graduations, characters and patterns display part, printing a light-permeable ink of a dark color, for example, grey on the surface of the display part to form the display area of the speed meter, and then printing an ink of black color on the meter surface except the speed display area of the dial plate to form an outer frame of the meter. Thus, the light emitted from the lamp permeates the display part only.

However, the prior art meters described above, are devoid of deluxe sense because a conventional color ink is merely printed on the surface of the transparent base. Even when, for example, a metallic ink is printed on the surface of the base, the desired metallic luster cannot be actually provided, and there remains the problem of impossibility of providing the dial plate showing the desired deluxe external appearance.

Also, when the metallic ink is printed on the base with a large thickness, the printed ink film does not permit permeation of light. On the other hand, when the metallic ink is printed on the base with a small thickness, a non-uniform distribution of the metal particles is inevitably perceived by the eyes of the driver. Thus, in any case, there is the problem of impossibility of providing the dial plate showing the desired beautiful external appearance.

SUMMARY OF THE INVENTION

With a view to solve the prior art problems pointed out above, it is an object of the present invention to provide a meter for an automobile, in which its dial plate or speed display area shows a deluxe metallic luster so that the meter can exhibit beautiful external appearance.

In accordance with one aspect of the present invention which attains the above object, there is provided a meter for an automobile comprising; a meter case, a pointer disposed in the meter case so as to be driven by a meter drive unit, a dial plate mounted in the meter case and having a display area and a graduations, characters and patterns display part formed on a base, the dial plate having a ground color providing a background to permit recognition of the position of the pointer, and an illuminating lamp located on the rear side of the dial plate mounted in the meter case so as to illuminate the dial plate from the rear side of the dial plate, wherein at least one of the display area and the display part of the dial plate is formed by evaporation of a metal film permeable to light.

In accordance with another aspect of the present invention, there is provided a meter for an automobile comprising: a meter case, a pointer disposed in the meter case so as to be driven by a meter drive unit, a dial plate mounted in the meter case and having a display area and a graduations, characters, patterns display part formed on a base, the dial plate having a ground color to provide a background to permit recognition of the position of the pointer, and an illuminating lamp located on the rear side of the dial plate mounted in the meter case so as to illuminate the dial plate from the front side of the dial plate through a light guide member, wherein at least one of the display area and the display part of the dial plate is formed by evaporation of a metal film permeable to light.

According to the first aspect of the present invention in which the dial plate is irradiated from its rear side with the light emitted from the illuminating lamp, the light permeates the display area or display part formed by the evaporated metal film so that the graduations, characters and patterns on the display part of the dial plate can be easily recognized by the eyes of the driver. Because the light-permeable display area or display part is formed by the evaporated metal film, a metallic luster that cannot be obtained by printing with a metallic ink can be exhibited so that the dial plate can provide a deluxe sense. Further, the metal film can be evaporated to be very thin and uniform. Therefore, the light emitted from the lamp can uniformly permeate the metal film so that the dial plate can exhibit very beautiful external appearance.

According to the second aspect of the present invention, the dial plate is irradiated from its front side with the light emitted from the illuminating lamp, thereby illuminating the display area or display part of the dial plate, so that graduations, characters and patterns on the display part can be easily recognized by the eyes of the driver. Because the display area or display part is formed by the evaporated metal film, a metallic luster that cannot be obtained by printing with a metallic ink can be exhibited, so that the dial plate can provide a deluxe sense and can exhibit very beautiful external appearance.

DESCRIPTION OF THE PREFERRED EMBODIMENTS

Figure 5:
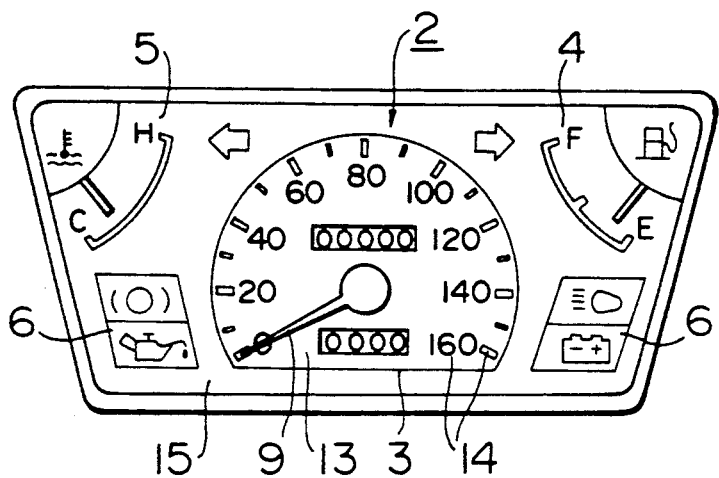
FIG. 5 is a front elevational view of an automobile's instrument panel.
Figure 6A:
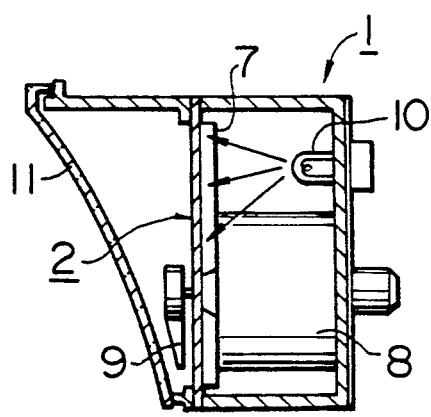
FIG. 6A and 6B are sectional side elevational views of two forms of the instrument panel shown in FIG. 5, respectively.
Figure 6B:
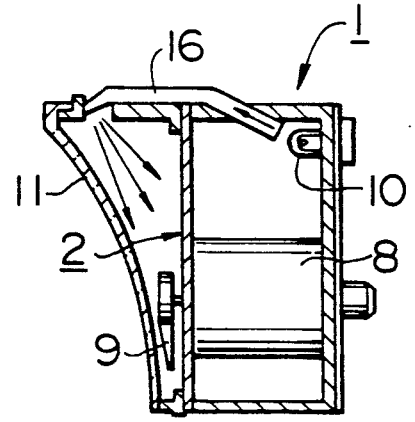

FIGS. 5, 6A and 6B show two forms of an instrument panel for an automobile. Referring to FIGS. 5, 6A and 6B, the instrument panel includes a meter case 1 having a forwardly projecting upper wall, and a predetermined dial plate 2 is fixed inside the meter case 1. A speed meter 3, a fuel gauge 4, a water temperature meter 5, various alarms 6, etc. are disposed on this dial plate 2. A plate 7 permeable to light is disposed behind the dial plate 2, and, for example, a meter drive unit 8 of the speed meter 3 is fixed to the meter case 1 on the rear side of the light-permeable plate 7. A pointer 9 of the speed meter 3 driven by the meter drive unit 8 on the basis of the result of actual speed measurement is disposed on the front side of the dial plate 2.

An illuminating lamp 10 is mounted on the back wall of the meter case 1. In the arrangement shown in FIG. 6A, light emitted from the lamp 10 passes through the light-permeable plate 7 to irradiate the back surface of the dial plate 2, thereby illuminating the dial plate 2 from the rear side by the light permeating the light-permeable plate 7. On the other hand, in the arrangement shown in FIG. 6B, a light guide member 16 is mounted on the upper wall of the meter case 1 to guide light emitted from the lamp 10 toward the front side of the dial plate 2 thereby illuminating the dial plate 2 from the front side. Further, an inclined glass plate 11 is disposed on the front side of the meter case 1.

Figure 1:
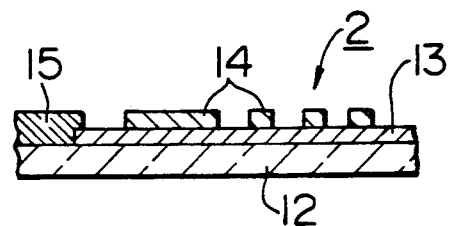
FIG. 1 is a schematic longitudinal sectional view of part of a dial plate in a first embodiment of the automobile's meter according to the present invention.

FIG. 1 shows a first embodiment of the present invention. Referring to FIG. 1, a very thin evaporated film of a metal such as aluminum, cooper or chromium providing a ground color is deposited on the surface of a transparent base 12 of the dial plate 2 to form a display area 13 of, for example, the speed meter 3. The transparent base 12 is made of a synthetic resin or like material, and the speed display area 13 is permeable or not permeable to light. The very thin metal film forming the speed display area 13 can be deposited by directly evaporating the metal on the surface of the base 12 according to the sputtering method or by means such as inmolding or hot stamping. The evaporated metal film has a thickness of 100 to 150Å, and can provide a light transmissivity of about 25 to 30%.

An ink of a dark color such as grey color is then selectively printed on the surface of the speed display area 13 to form a graduations, characters and patterns display part 14. A black ink is then printed on the dial plate 2 except the speed display area 13 to form an outer frame 15 of the meter.

When light emitted from the lamp 10 irradiates the rear side of the dial plate 2 in this first embodiment, as shown in FIG. 6A, the light permeates the speed display area 13 only, so that the graduations, characters and patterns on the display part 14 can be recognized as silhouettes by the eyes of the driver. On the other hand, when the light emitted from the lamp 10 irradiates the dial plate 2 from the front side, as shown in FIG. 6B, the graduations, characters and patterns on the display part 14 of the speed display area 13 can be directly recognized.

In this first embodiment, the display area 13 is formed by evaporation of the metal film. Therefore, a metallic luster that cannot be obtained by printing with a metallic ink can be exhibited so that the dial plate 2 can provide a deluxe sense. Further, because the metal film is deposited by the evaporation, the metal film can be formed to be very thin and uniform. Therefore, the light emitted from the lamp 10 can uniformly permeate the metal film, so that the dial plate 2 can exhibit very beautiful external appearance.

Figure 2:
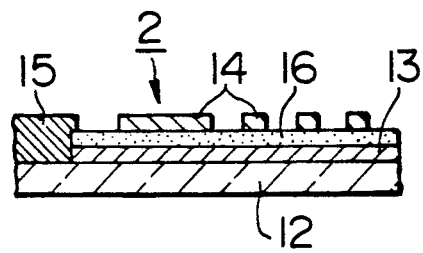
FIG. 2 is a schematic longitudinal sectional view of part of a dial plate in a second embodiment of the automobile's meter according to the present invention.

FIG. 2 shows a second embodiment of the present invention. This second embodiment is generally the same as the first embodiment, except that a coating layer 16 such as a hairline pattern layer or a mat pattern layer provided by printing with a light-permeable color ink is formed on the surface of the display area 13 formed by evaporation of the metal on the dial plate 2 shown in FIG. 1.

According to this second embodiment, the provision of the coating layer 16 is effective in that the surface of the evaporated metal film forming the display area 13 can be made smoother, and a more effective metallic luster can be provided. Further, because the coating layer 16 is formed by the color ink, a colored metallic luster can be provided.

Figure 3:
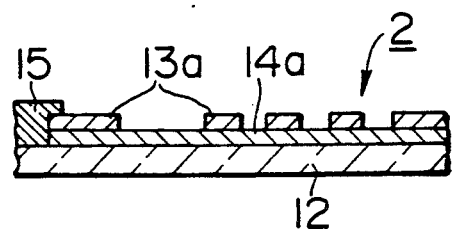
FIG. 3 is a schematic longitudinal sectional view of part of a dial plate in a third embodiment of the automobile's meter according to the present invention.

FIG. 3 shows a third embodiment of the present invention, and, in FIG. 3, like reference numerals are used to designate like parts appearing in FIG. 1. Referring to FIG. 3, a very thin evaporated film of a metal such as aluminum, copper or chromium providing a ground color is deposited on the surface of a transparent or opaque base 12 of a dial plate 2 to form a graduations, characters and patterns display part 14a which is permeable or not permeable to light. A light-permeable ink of a dark color, for example, grey color is then selectively printed on the surface of this display part 14a to form a display area 13a of, for example the speed meter 3. A black ink is then printed on the dial plate 2 except the speed display area 13a to form an outer frame 15 of the meter.

When light emitted from a lamp 10 irradiates the rear side of the dial plate 2, in this third embodiment, the light permeates the display part 14a only, so that the graduations, characters and patterns can be recognized by the eyes of the driver. On the other hand, when the light emitted from the lamp 10 irradiates the front side of the dial plate 2, the graduations, characters and patterns can also be easily recognized.

In this third embodiment, the display part 14a permeable to light is formed by the metal evaporation. Therefore, a very beautiful metallic luster can be exhibited, so that the dial plate 2 can provide a deluxe sense. Further, because the metal film is deposited by evaporation, the metal film can be formed to be very thin and uniform. Therefore, the light emitted from the lamp 10 can uniformly permeate the metal film, so that the dial plate 2 can exhibit very beautiful external appearance.

Figure 4:
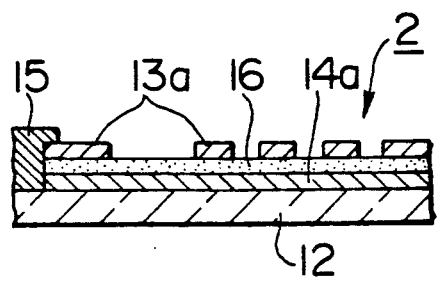
FIG. 4 is a schematic longitudinal sectional view of part of a dial plate in a fourth embodiment of the automobile's meter according to the present invention.

FIG. 4 shows a fourth embodiment of the present invention. This fourth embodiment is generally the same as the third embodiment, except that a coating layer 16 is formed on the surface of the display part 14a formed by evaporation of the metal on the dial plate 2 shown in FIG. 3.

According to this fourth embodiment, the provision of the coating layer 16 is effective in that the surface of the evaporated metal film forming the display part 14a can be further made smoother, and a more effective metallic luster can be provided. Further, when the coating layer 16 is formed by the color ink, a colored metallic luster can be provided.

It is apparent that when the graduations, characters and patterns display part shown in each of FIGS. 1 and 2 or the display area shown in each of FIGS. 3 and 4 is formed by printing with a light-permeable color ink, the meter can be illuminated by light which permeates the display area and display part of the meter.

What is claimed is:

1. A meter for an automobile comprising:
    a meter case;
    a dial plate mounted in said meter case, said dial plate having a front side and rear side;
    a meter drive unit disposed on the rear side of said dial plate;
    a pointer disposed on the front side of said dial plate and driven by said meter drive unit; and
    an illuminating lamp located on the rear side of said dial plate for illuminating said dial plate;
    wherein said dial plate comprises a base, at least one display area, and at least one display part that defines graduations, characters and patterns;
    wherein at least one of said at least one display area and said at least one display part is a metal film formed on said base by evaporation, said metal film having a bright color and forming a background to said pointer; and
    wherein a coating layer is disposed on said metal film.

2. A meter according to claim 1, wherein said metal film has a thickness of 100 to 150Å and provides a light transmissivity of about 25 to 30 percent.

3. A meter according to claim 1, wherein said metal film is permeable light, and a light-permeable plate is disposed on the rear side of said dial plate so as to illuminate said dial plate from the rear side thereof.

4. A meter according to claim 1, wherein a light guide member is mounted on an upper part of the casing so as to illuminate said dial plate from the front side of said dial plate.

5. A meter according to claim 1, wherein said coating layer has a hairline pattern finish.

6. A meter according to claim 1, wherein said coating layer has a mat pattern finish.

7. A meter according to claim 1, wherein said coating layer comprises a light-permeable color ink.

* * * * *

UNITED STATES PATENT AND TRADEMARK OFFICE
CERTIFICATE OF CORRECTION

PATENT NO. : 5,129,269
DATED : 14 July 1992
INVENTOR(S) : Tsutomu IIZUKA et al.

It is certified that error appears in the above-identified patent and that said Letters Patent is hereby corrected as shown below:

On title page, item., at "[73] Assignee," Please change "Darling-Delaware Company, Inc., Dallas, Texas" to -- Yazaki Corporation, Tokyo, Japan --.

On title page, at "Attorney, Agent or Firm," Please change "Harold E. Meier" to -- Venable, Baetjer and Howard --.

Signed and Sealed this

Seventh Day of November, 1995

Attest:

BRUCE LEHMAN

*Attesting Officer*     *Commissioner of Patents and Trademarks*